United States Patent [19]
Ahrweiler et al.

[11] 3,993,426
[45] Nov. 23, 1976

[54] CONTINUOUS PRESS HAVING IMPROVED ANTI-FRICTION ROLLERS

[75] Inventors: Karl-Heinz Ahrweiler, Krefeld; Kurt Quoos, Krefeld; Eduard Küsters, Krefeld-Forstwald; Valentin Appenzeller, Kempen, Niederrhein, all of Germany

[73] Assignee: Eduard Kusters, Krefeld-Forstwald, Germany

[22] Filed: Oct. 31, 1974

[21] Appl. No.: 519,626

Related U.S. Application Data

[63] Continuation-in-part of Ser. No. 308,556, Nov. 21, 1972, Pat. No. 3,851,685.

[30] Foreign Application Priority Data

| Nov. 8, 1973 | Germany | 2355797 |
| Nov. 22, 1971 | Germany | 2157746 |
| Oct. 5, 1972 | Germany | 2228760 |

[52] U.S. Cl. .............................. 425/371; 74/245 R; 144/281 B; 156/580; 156/583
[51] Int. Cl.² ..................... B27D 3/04; B29D 7/14
[58] Field of Search .......... 156/580, 583; 74/245 R, 74/245 C; 144/281 R, 281 A, 281 B, 281 C, 281 D, 281 E, 283; 425/224, 364, 371, 394, 383, 406; 100/151, 152, 153, 154, 93

[56] References Cited
UNITED STATES PATENTS

| 3,029,086 | 4/1962 | Stokvis | 74/245 R X |
| 3,120,862 | 2/1964 | Burger | 144/281 B |

Primary Examiner—Othell M. Simpson
Assistant Examiner—W. D. Bray
Attorney, Agent, or Firm—Kenyon & Kenyon Reilly Carr & Chapin

[57] ABSTRACT

In a continuous press having two rotatably driven endless conveyor belts forming opposed, substantially linear spans defining a pressing zone with press platens applying pressure through the travelling spans to work carried therebetween with anti-friction roller means interposed between the platens and spans, the anti-friction roller means being endless loops of rotatably unpowered roller chains forming a bed interposed between the platens and the belt spans with the roller chain spans extending longitudinally with respect to the belt spans and being transversely packed together with each chain individually free to travel independently with respect to the others and the belt span wherein the chains are comprised of units of at least two equal diameter rollers installed in a cantilevered manner on roller pins, the roller pins being linked together by a chain of flat interposed links with adjacent rollers in the direction in which they run of the same length and having their outer end faces situated in a plane which forms the outer delimiting surface of the chain.

10 Claims, 7 Drawing Figures

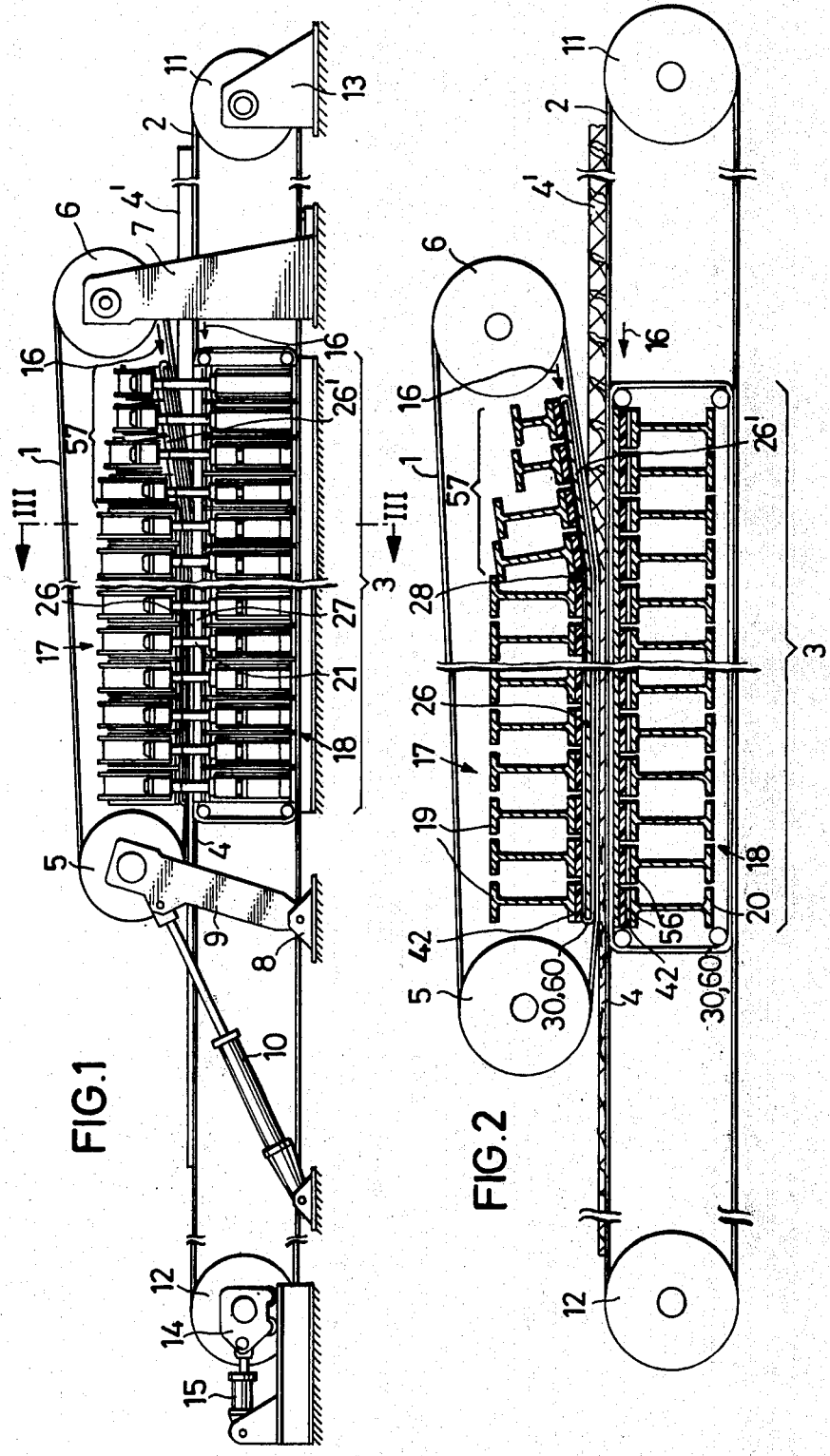

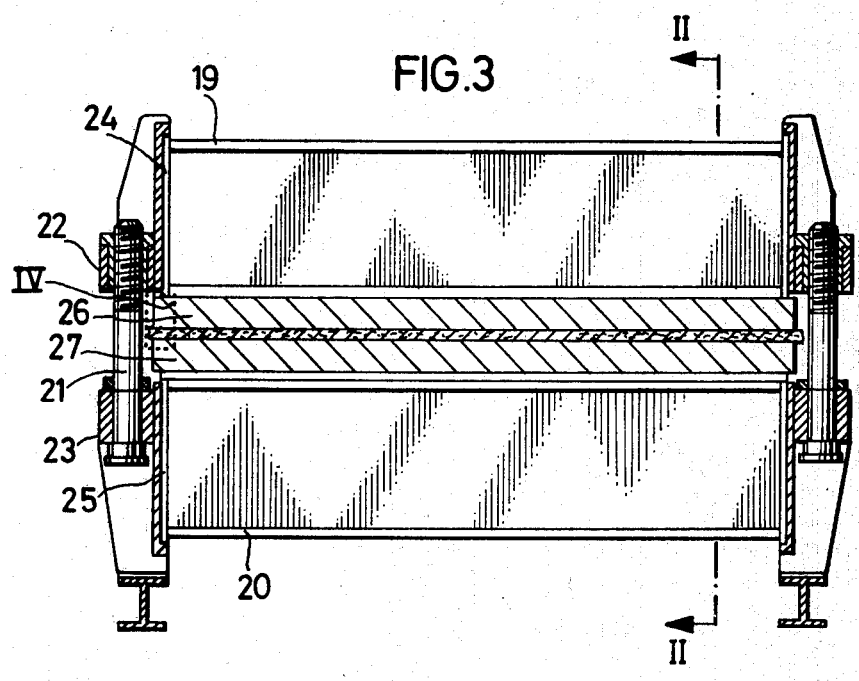

Fig. 6
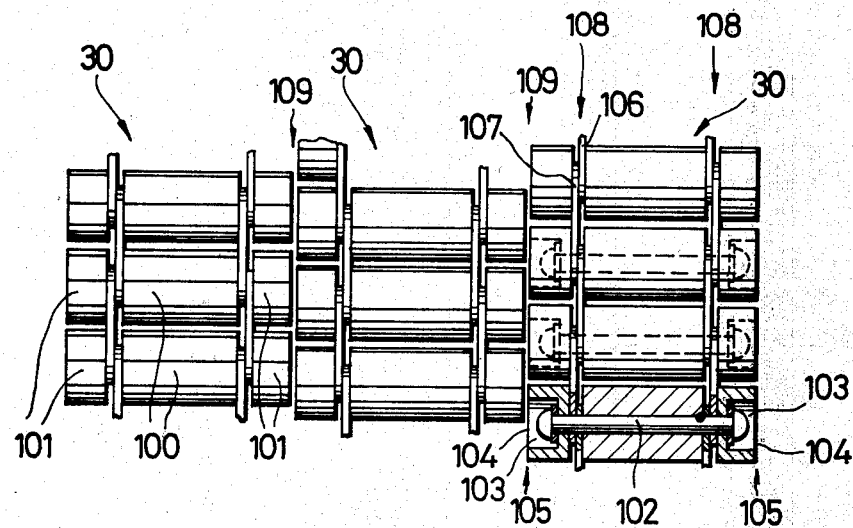
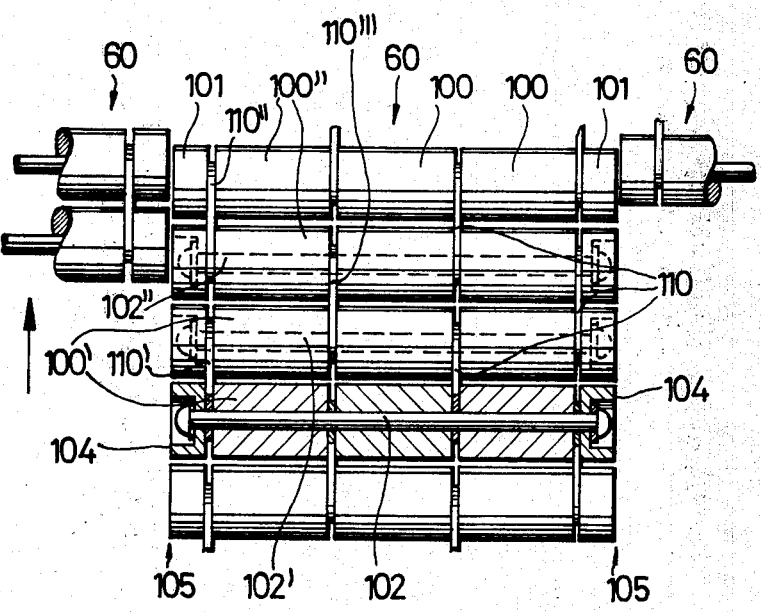
Fig. 7

CONTINUOUS PRESS HAVING IMPROVED ANTI-FRICTION ROLLERS

RELATED APPLICATIONS

This application is a continuation-in-part of application Ser. No. 308,556, filed Nov. 21, 1972, now U.S. Pat. No. 3,851,685, issued Dec. 3, 1974, the disclosure of which is hereby incorporated by reference.

BACKGROUND OF THE INVENTION

This invention relates to continuous presses of the type having two rotatably driven endless conveyor belts forming opposed, substantially linear spans defining a pressing zone with press platens applying pressure through these travelling spans to work carried therebetween with anti-friction means interposed between the platens and spans in general, and more particularly to such a press having improved anti-friction roller chains.

Presses of this nature are particularly useful for the production of panels of pressed wood chips and other materials with the strip conducted between the endless forming bands to result in the continuous production of the panel or the like. Such an arrangement is disclosed in the aforementioned U.S. Pat. No. 3,851,685.

One of the earliest developments in this area is disclosed in U.S. Pat. No. 2,142,932. In the press disclosed therein, forming bands made of a sequence of flexible steel strips extending across the strip are supported relative to the supporting structure by rodlike rollers extending over the supporting width and conducted at the side on chains. The disclose rollers are of relatively small diameter and are close together so that there is no observable undulation of the steel strips. The rollers transmit heat from a heated support structure through the strip of material being formed between the forming bands. Another similar design using forming bands which are hung together is illustrated by German Pat. No. 923,172.

However, when it is desired to use such a press to produce strips using particularly high pressure such as panels made from heat hardening synthetic materials difficulties arise in the proper and even running of the rollers.

Where such high pressures are necessary and because of the necessary flexibility of the forming bands a particularly small spacing of the supports must be maintained so that no undesirable flexure of the forming bands between individual support points occurs. However to obtain such a small spacing requires smaller roller diameters so that, with strip widths of 2 to 2.5 meters, very long and thin roller rods become necessary. In spite of the substantially decreased roller spacing there will still remain some bending of the strips between the individual rollers. With roller diameters of 10 to 20 mm a bending of some hundreds of a mm will be experienced. The slight bending at a given position of the forming band will of course be eliminated when that portion of the band again comes under a roller. However it will then reoccur as the band passes the roller. The totality of the bending, thus, in effect is pushed along the length of the forming band.

This pushing onward, since this is of course not an arrangement having an ideal elastic characteristics, leads to forces with the distorted and bent forming band acting on the rollers along their entire length. Thus there is tendency to produce a bending of the rollers in the rolling plane is such way that the rollers in the region between the lateral chains run somewhat ahead of the rollers at the end in the direction of travel in the forming band.

A similar affect occurs when uneven loading across the width of the strip. The strips of material with which the process starts out such as wood chip panels or the like are pressed together after being loosely shaken onto the lower forming band. Such a supply cannot be perfectly uniform but will always have zones which, under compression to a certain height, offer greater resistance than other neighboring zones. To overcome the unequal resistances the forming bands undergo greater bending between the rollers in the areas of greater resistance than in adjacent regions and thus act more strongly against the rollers. Thus, to overcome these effects, a greater force in advancing the forming band is required, which force acts in shear on the rollers more strongly in the higher pressure regions than in adjacent regions. Because of this there is a tendency to bend the long thin rollers in the plane of the rollers.

It is important to note however that a bent roller has very unfavorable running characteristics in that any section of the roller having its axis not perfectly perpendicular to the direction in which it runs forward can be troublesome. The rolling direction of the bent section slants from the longitudinal direction of the forming band and of the supporting structures. With an unhindered rolling this result in a lateral displacement of the roller relative to the forming band and the supporting structures and at the same time a lateral displacement of these relative to one another. However, these displacements are prevented because of the guidance of the elements in the machine which guidance has associated therewith great compelling forces. The forming bands and supporting structures are thus held in position relative to the rollers. The roller can be considered as being made up of a multitude of small discs. With a bent roller some of these small discs will run at a slant to the strip but can actually move forward only in a straight line. Thus pure rolling is not possible. The movement of the forming bands relative to the supporting structures can occur only through the rollers being continously somewhat displaced relative to their support, i.e., they undergo a corresponding friction.

Furthermore the roller's circumference at places where it rolls properly and at other places where it has a slanting axis differs in length so that in advancing certain distance the different parts of the roller travel through different angles. That is to say they become twisted relative to one another. The more the rollers slant at some place the more it tends to run ahead of other regions. This effect results in an automatic increase of bending once it has occured. However an equilibrium occurs because of the restoring strength of the rollers when the twisting moment produced at the circumference is counterbalanced by the friction force of the slippage of the roller on its surface. This phenomenon also leads to considerable friction of the rollers when imperfect rolling takes place.

Where great linear pressures are applied these roller defects play an important and detrimental part since the continuous friction wears both the rollers and the bands. Putting the pressure transmitting region of the equipment into proper operating condition is a very expensive undertaking. The expense involved when forming bands, rollers and sometimes even supports have to be replaced can be considerable. It should be noted that the type of machine being considered is one having a width of 2 to 2.5 meters and a length of 10 to 20 meters. When a substantial portion of the machine must be replaced it will be out of use for a long time and will affect not only the production of the machine but the production of machines ahead and behind it on the production line. As a result anything which decreases the above noted wear problems can be of considerable importance.

Furthermore the above described frictional problems can also result in the requirement for greater power to advance the forming bands. Clearly a band supported against perfectly running rollers can be advanced much more easily than one where secondary forces have to be overcome because of slanted rollers. Because the forces needed to pull the forming bands through the pressure region is substantial, particularly with high operating pressures that may come close to the load which can be applied within the elastic limit, and improvement of the running characteristics of an arrangement of this type can form this point of view also be of considerable practical importance.

Finally, the requirements for precision in the panels being produced are not inconsiderable. When rollers or bands are worn and have made ruts in their supports the thickness of the panels produced may have variations going far beyond allowable tolerances. In addition such wear can also entail irregular loading of of the rollers and a corresponding nonuniform transmission of heat.

Another press of this nature is disclosed in French Pat. No. 1,469,225. The arrangement therein starts out with a continuous press of the general type described above but having instead of continuous rollers going across the width of the strip of material a sequence of individual rollers with pairs joined together across the width of the panel using coupling rods. Between adjacent rollers, in the lengthwise direction of the panel, are linking chains. From a functional standpoint, this type of arrangement is not too much different than continuous rod-like rollers. With respect to the forces exerted on the rollers through the bending of the forming bands, the conditions are in one way substantially the same. In the effect of these forces the roller arrangement of this Patent is more unfavorable since the rollers are not made in one piece and thus do not have the corresponding resistance to bending but are instead weakened at the coupling points. A series of adjacent rollers across the panel of material thus bends more easily. In addition there is a supplementary coupling using inner linking chains. The rollers are not only connected laterally with one another but also to the preceding and following rollers so that a mesh-like roller is produced. As a result of local error of position is not limited to one single position but spreads out into the adjacent rollers through the coupling rods and linking chains. Thus in comparison to the arrangement of U.S. Pat. No. 2,142,932 the error is increased in that the error of single roller is transmitted directly to the roller ahead and behind it.

The aforementioned U.S. Pat. No. 3,851,685 suggests a solution to the problem arising with such an arrangement of rollers. In the apparatus disclosed therein, the rollers are short as compared to the width of the panel and are disposed close together across the panel. The rollers are formed into chains with a plurality of the chains packed closely together and free to move independently of each other. The chains for the rollers can also be made as taught by the aforementioned Specification as standard light weight machinery roller chains. Typical dimensions of such chain are given in that Specification. These chains have rollers which are linked together at both sides of a roller with link ends overlapping.

When using the conventional type of chain there is of necessity in a spacing between adjacent rollers across the panel. At these points the forming bands has no support on the rollers. The gap will have a width equal to four times the width of the links used, plus a certain amount of play which is desired and an amount resulting from the height of the rivoting head formed on the end of the roller pin. The space forms, in the lengthwise direction of the band, lanes which are free of supports. Where pressure which are not too high are being used the resulting gaps are not intolerable. However, with certain materials such laminated synthetic materials it is important to have as uniformed an application of high pressure as possible. The arrangement of the rollers in the above described arrangement transmits not only pressure but also heat from the heated supporting structure to the forming bands and thus to the compressed hardening mass between them. Conventional type chains impart a strip-like transmission of pressure and heat and may lead to imperfect products. Thus, it can be seen that there is need for roller arrangement in which rollers run as perfectly as possible to transmit the high pressure and where required to transmit heat as uniformly as possible to the forming bands and the mass between them.

SUMMARY OF THE INVENTION

The present invention solves this problem using a plurality of closely packed roller chains which are free to roll independently of each other. The roller chains have flat interposed links lying in planes perpendicular to the roller axis at the end of the roller pin of adjacent rollers. The links are coupled to at least two equal diameter rollers per unit with the rollers installed in a cantilevered manner. Adjacent rollers in the running direction are of the same length and have their outer end faces lying a plane which forms the outer limiting surface of the roller chain.

The independent mobility of the chains of rollers gives flexibility of the total roller chain field with mutual displacements in the longitudinal direction avoiding stresses in erroneous running. As an example, with an operative width of 2.5 meters and rollers of 2.5 mm diameter, approximately 30 to 100 roller chains can be tightly packed one along side the other.

With this arrangement there are no links or other projections outside the outer end faces of the outer roller. This permits adjacent roller chains to be packed close together without a gap which can cause a disturbance in the forming band. Because of the equal lengths of the rollers in the direction of running, adjacent rollers can be provided in conventional fashion with links in a regular arrangement having advantages from a manufacturing view point. Of course at the point of links between rollers there will remain a space which is not supported. However the space can be made quite small and in the most favorable case can be only the thickness of one link. In many applications a gap of this nature will cause no trouble as compared to the arrangement of usual chains having one roller or even with chains of a similar nature having double, triple or more rollers. In each case with these older type chains substantially larger gaps are present between the individual chains which are of a sufficient magnitude to cause streaked irregularities in the strip being processed.

Although the present invention can be practiced with only two rollers per unit with a link therebetween over the length of a link chain, it is preferable that roller chains having at least three rollers per unit be used. In the case of two rollers problems may occur from the very short roller pins supporting the rollers, which correspond only to the width of links when the roller pins oscillate in the rolling planes, resulting in a tilting of rollers. However with a roller unit having at least three rollers with links disposed between each two rollers these problems are avoided. The rollers following each other in the running direction are of the same length with the outer rollers always cantilevered and their end faces forming the outer limiting plane. With at least two rows of links present the roller pins are stabilized in the roller plane.

Because individual chains can be packed closely together the gaps can be made as small as is practically possible. There can be extremely thin guiding and friction diminishing separating strips installed between the individual chains. These however should not be spaced from the individual roller chains more than approximately the thickness of a link.

However it is preferred that the laterally adjacent roller chains be limited relative to one another only by the end faces of their rollers. In such a case there is essentially no unsupported area between individual roller chains.

In the first form of construction shown the roller chain links are of conventional design. The roller pin passes through two links. One is the link from the roller unit directly behind the roller unit with which the pin is associated and the other the link connecting the unit directly ahead of the associated unit. Thus two links rest side by side forming a gap corresponding to twice the thickness of a link. In an alternative form of construction the gap is reduced. In this form of construction two adjacent rollers have their roller pin passing through a first link. Thus, first and second rollers are coupled together by a first link. Similarly the next two rollers in the running direction are coupled together with a second link lying in the same plane i.e., the third and fourth rollers are coupled by the second link. Coupling between the first and second rollers and the third and fourth rollers is by means of a third link coupling the second roller to the third roller, this link being placed at the opposite end face from the first and second links. In this way the links in one plane do not form a coherent chain but follow one another with the connection at the dividing points through links present only in the laterally adjacent plane. Since this arrangement prevents an over lapping of adjacent links in the running direction the lateral spacing between rollers of a unit corresponds only to the thickness of one link. In the illustrated embodiment a chain made up of three links and two cantilevered exterior links coupled in this fashion is shown. Also illustrated in both embodiments are outer rollers which are substantially shorter than the inner roller which is helpful in some applications. As noted above because the outer rollers are always mounted in a cantilevered fashion the overhang of the roller pin is eliminated. As a result adjacent roller chains can be packed together as closely as is possible. The gap between individual roller chains will correspond only to the clearance needed for a frictionless rotation.

BRIEF DESCRIPTION OF THE DRAWINGS

FIG. 1 is an elevation view of a press having the chains of the present invention installed.

FIG. 2 is a vertical lengthwise section through the press of FIG. 1 taken along the line II–II of FIG. 3.

FIG. 3 is a cross section through the press along the line III—III of FIG. 1.

FIG. 6 is a partial view of the first type of construction of a chain of rollers according to the present invention.

FIG. 7 is a partial view of second form of construction of the chain of rollers.

DETAILED DESCRIPTION OF THE PREFERRED EMBODIMENT

Figure 4:
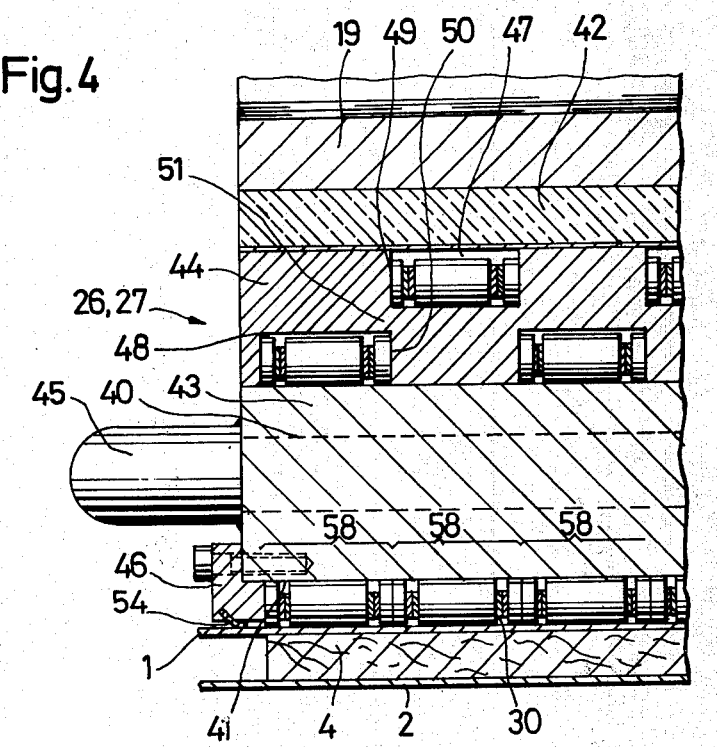
FIG. 4 is a partial cross section through the edge region IV of FIG. 3 showing the pressure transmitting plate which runs on the chain of rollers.

FIG. 1 shows the upper and lower endless conveyor belt loops 1 and 2 respectively, which form opposed, substantially linear spans defining the pressing zone embraced by the bracket 3. These belts are made of thin strip steel having a thickness of about 1 to 1.5 mm. and are flexible both longitudinally and transversely. The upper belt 1 is looped around rotative drums 5, and 6, the drum 6 being fixed against lateral motion by being journaled in stationary pedestals 3; the drum 5 being capable of lateral motion by being journaled in swinging arms 9 provided with suitable swinging means 10 which provide for the application of proper tension to this upper belt. The lower belt 2 at one end loops around a rotative drum 11 which is also fixed against lateral motion by being journaled in stationary pedestals 13, the other end of this lower loop passing around a rotative drum 12 journaled in sliding mountings 14 pulled by suitable actuating means 15 so that the tension of the lower belt loops may be properly attained.

The work 4 enters at the right hand end of the press in FIG. 1 as loose material 4' and comes out the left hand end with a reduced thickness, assuming wood chip board or the like is being made.

As shown by FIG. 3 the working spans of the two belts in the zone 3 are pressed together by press platens 27 and 26, the lower platen 27 being held against downward motion by transverse I-beams 20 supported by base member which extend longitudinally for the length of the press. The upper platen 26 is supported by transverse I-beams 19 which can be pulled downwardly by suitable actuators 21 which may be either of the motorized mechanical screw type or hydraulically actuated. The actuators 21 are coupled between brackets 22 and 23 which are connected to end plates 24 and 25 of the beams 19 and 20. There are a plurality, or series, of these beams 20 and 19 and each of the upper beams 19 is provided with its own pair of actuators 21. The upper beams 19 form an upper support structure 17 and the lower beams 20 a lower support structure 18.

The platens 26 and 27 each extend for the full length of the zone 3 as one piece constructions, excepting that, as suggested in FIG. 2, the upper one may be in two sections to define a converging entrance zone for the work so that the latter can receive a graduallly increasing pressure as it initially enters the press. Although the beams 20 and 19 are shown as being relatively massive and, therefore, very resistant to beam stress, it is still possible for them to deflect slightly under the loading applied by the actuators 21. Should this deflection be troublesome, hollow cushions may be used between the beams and the platens, these cushions extending for the full length of the beams with which they are used and being made of flexible sheet metal, for example, and filled with fluid under pressure sufficient to carry the loading to which the beams are subjected. With such an arrangement beam deflection is not transmitted to the platens. In FIG. 2 such cushions are indicated at 56. They may be used between any of the beams or all of the beams whenever needed to obtain a uniform loading throughout the widths of the platens.

The roller chain loops providing the anti-friction means between these platens and the steel strip conveyor belt spans throughout the pressing zone 3, are generally indicated in FIG. 2 as the roller chains 30, 60 extending between the lower belt 2 and the lower platen 27 and being individually looped by individual looping sprocket wheels approximately positioned and which are unpowered and rotatively freed from one another. It can be seen that these roller chain loops 30, 60 encircle both the lower platen 27 and its supporting beam 20. By lengthening the upper belt loop 1, the same arrangement could be used for the upper roller chain loops 30, 60 which must run between the upper belt loop and the upper platen 26; but by specially designing the upper platen, as disclosed hereinafter, the chain loops 30, 60 may be much more compactly arranged as is very generally indicated by FIG. 2.

Figure 5:
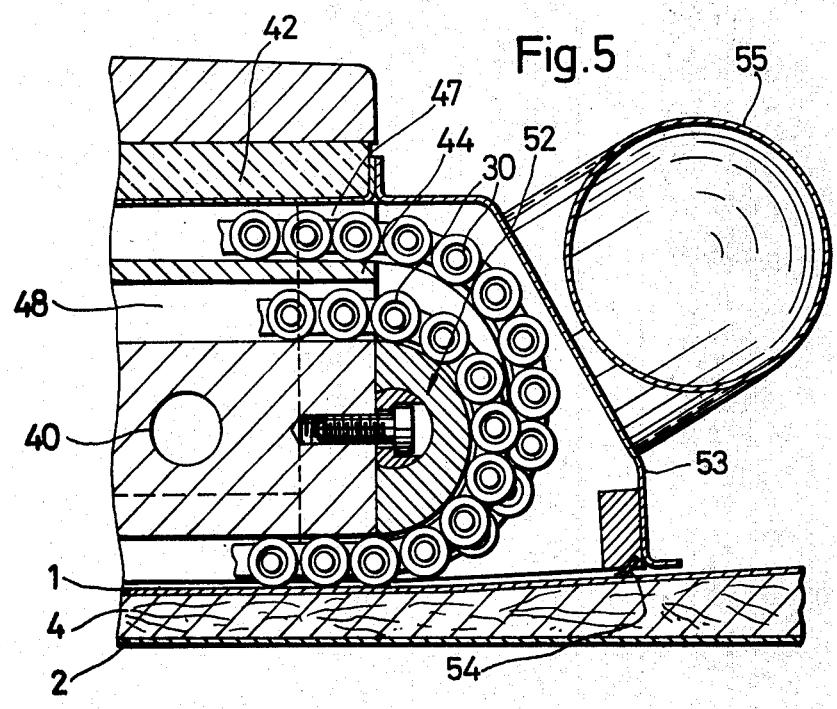
FIG. 5 is a partial lengthwise section throught the initial region of the plate of FIG. 4.

On FIGS. 4 and 5, the chain loops are shown as they appear with their spans running between the upper platen 26 and the upper flexible loop 1. This is the portion IV of FIG. 3.

As illustrated by FIG. 4 the platens 26 and 27 comprise a heating and supporting plate 43 and a separate return plate 44. The FIG. illustrates the partial cross section through a border region situated above the strip 4 of FIG. 2. It will be recognized so that corresponding arrangement may be provided below the strip 4.

The platen 43 has a heating channel 40 connected at its ends through a bent tube into a closed flow path. The plate 43 has a smooth undersurface 41. This flat surface 41 is not adjustable by webs or the like and may be machined all at once by planing and grinding. The surface 41 forms a common runway for the adjacent roller chains 30, 60. It should be noted that the reference numeral 30 refers to a type of chain to be described below in connection with FIG. 6 and the reference numeral 60 to the alternate form of chain to be described in connection with FIG. 7. Either of these chains may be used the chain 30 being used in FIGS. 4 and 5 as an example.

The roller chains 30, 60 roll, when forward motion of the forming bands occur, between the forming bands and the underside of plate 43. In this arrangement adjacent roller chains 30, 60 are situated with their outer faces directly opposite one another. At the lateral limits of the plate 43 guide strips 46 are provided for guiding all the roller chains 30, 60. The roller chains 30, 60 can run independently of one another inside the area defined by the guide strip 46. Because of roller chains 30, 60 are directly against one another when they are conducted back between the supporting structures 17 and 18 and the forming bands 1 and 2 it is necessary to have a special form of construction of the return plate 44 as is illustrated on FIG. 4 and 5. The return plates 44 are more than twice as thick as the diameter of the rollers on the roller chains 30, 60. The return plate 44 has on its side closest to the supports 19 and 20 respective return grooves 45 and on the side next to the plate 43 return grooves 48. The grooves 47 and 48 are a bit deeper than the diameter of the roller chains 30 and 60. Moreover they are offset from one another across the strip 4 so that the limiting surfaces 49 and 50 are located approximately vertically one above the other. In this way the limiting surface of adjacent roller chains 30 and 60 may also travel in the same plane. The force giving operative pressure is transmitted through the intermediate region 51 existing because of the thickness of the return plate 44 exceeding double the roller diameter. In order to avoid heat losses a heat insulating intermediate plate 42 is disposed between the upper side of the return plate 44 and the support structure 19 or 20.

At the beginning of the end plates 26 and 27 shape elements 52 are provided which conduct the roller chains 30, 60 from the underside of the plates 45 to the upper side i.e., conduct them to the return plate 44. The shaped elements 52 have different deviating radia for the adjacent roller chains so that return grooves 47 and 48 of different height are provided into and out of the plate 44. In the embodiment illustrated by FIGS. 4 and 5 a slight pneumatic over pressure is maintained in the rolling region of the roller chain 30, 60 to prevent any entry of dust or the like into this region. For this purpose a covering 53 fastened to the supporting structure and sealed by seals 54 relative to the advancing forming band 1 is provided between the support structure and the forming band. The enclosed space so formed is supplied with compressed air through a conduit 55. The seal formed by the seal 54 need not be hermetic, it being only necessary to maintain a slight overpressure.

It is essential in the arrangement of the chains that each two adjacent chains 30, 60 be able to advance independently of one another. A complete supporting arrangement for the forming bands 1 and 2 is in the form of a field which in the longitudinal direction is subdivided into individual portions which, with suitable pressure or stressing in a longitudinal direction, can shaft relative to one another. As a result stresses cannot form within the roller chain arrangement through differences and be carried along by the forming hands.

FIG. 6 and 7 illustrate two types of roller chains 30, and 60 made in accordance with the present invention. FIG. 6 illustrates portions of three adjacent roller chains 30 of the type shown in FIG. 4 and 5. The roller chains 30 in each instance comprise a middle roller 100 and two outer rollers 101 of equal diameter. The three rollers are mounted on a common roller pin 102 which is riveted at its end in an outer recess 103 in the end face of the outside of outer rollers 101. The rollers 101 are thus mounted in a cantilevered fashion on the roller pin 102 with no portion of the roller pin projecting beyond the outer face 104 of the outer rollers 101. All the end faces 104 on the side of the roller chain 30 thus lie in plane 105 which forms the outer limitings surface of the roller chain 30 on that side. The two planes 105 are parallel to each other. Between roller 100 and a roller 101 links 106 and 107 are disposed. The roller pins 102 of two immediately adjacent units of the roller chain pass through the ends of the links 107 and 106. A unit is the combination of the roller 100 along with two rollers 101. On each roller pin 102 the leading end of a link 106 or 107 is mounted and along side it the trailing end of a link 107 or 106. The links overlap alternatively at one side or the other thus forming a chain 108 of links. The rollers 100 and 101 directly following one another in a running direction are always of the same length. In the longitudinal gaps thus formed extending in the lengthwise direction of the chain 40 the link chains 108 are disposed. Within these gaps there is of course no support for the forming bands 102 and also no direct conducted transfer of heat. The width of the gaps may however be quite small and in the case of the roller chain 30 amounts to only double the thickness of the links plus the necessary clearance for obtaining mobility of the roller chain 30. At the places separating adjacent roller claims 30, because of the cantilevered installation of the outer rollers 101, the roller chains 30 abut directly against one another. As a result practically the total width of the strip is covered with the exception of the gaps occupied by the chain of links 108.

In order to obtain stable mounting of the cantilevered rollers 101 they are made shorter than the inner rollers 100. In the illustrated example the ratio of widths is approximately 1:4. The shortness of the rollers 101 makes it possible to use this kind of roller chain even with high pressures without a danger of bending the roller pins 102 and having to worry about a skewing of the rollers 101.

FIG. 7 illustrates roller chains 60 which differ from the roller chains 30 in that the gap between the rolls of adjacent rollers 100 or 101 in the running direction do not have complete link chains 108 disposed therein. In each of the planes adjacent links 110', 110'' and 110''' are in adjacent gaps. Thus, for example, the two inner rollers 100' of FIG. 7 are connected by the link 110' the two following inner rollers 100'' are connected in the same plane by link 110'. Between the links 110' and 110'' there is no connection in this plane. The required connection is made by the link 110''' placed in the adjacent gap connecting the roller pin 102' of the leading roller 100' to the roller pin 102'' of the lagging roller 100''. With this roller chain arrangement 60 as shown in FIG. 7 each roller pin 102 supports three inner rollers 100 one along side the other and two outer rollers 101 per unit. The units are held together at two staggered places by links 110 so that there is good support against tilting. One important advantage of the roller chains 60 is that between each two laterally adjacent rollers 100 and 101 a gap of only the width of a single link is present. The construction of the cantilevered outer rollers 101 and the arrangement of the roller chain 60 is the same as that for the roller chains 30. This illustrated construction of the roller pin 102 is used only as an example. It is possible to have, instead of the half round rivited ends on the roller pin, a shaping into a suitably formed recess in the outer face 104 of the outer roller 101. With the two roller chains 30 and 60 the diameter of the rollers 100 and 101 is made so that the spacing of the roller axis is almost the same i.e., so that the rollers almost touch one another at their peripheries so that the supporting lines may be as close together as possible.

Thus a continous press having improved roller chains has been shown. Although specific embodiments have been illustrated and described, it will be obvious to those skilled in the art that various modifications may be made without departing from the spirit of the invention which is intended to be limited solely by the appended claims.

What is claimed is:

1. In an apparatus for exerting a flat pressure on a lengthwise section of an advancing strip such as a continuous press for the continuous production of panel materials being produced under pressure in which the strip is conducted between endless forming bands extending across the width of the strip and circulating in the direction in which the strip advances with pressure transmitted to the endless forming bands from the press platens applying pressure to said forming bands with means between said forming bands and press platens for transmitting pressure in an anti-friction manner, improved means for transmitting pressure in an anti-friction manner disposed between said forming bands and press platens comprising a plurality of independent roller chains transversely packed closely together and supported so that they can move forward in the direction of advancement of the strip and forming bands, each of said independent chains being individually free to travel independently with respect to the others and said forming bands, with each of said independent chains being formed of a plurality of linked units, each unit including at least two rollers supported on a roller pin with flat links lying in a plane perpendicular to the roller pin linking the units, the outside rollers of each unit being cantilevered on the roller pin, all rollers in a row in the direction of travel being of equal diameter and having their outer end faces situated in a plane which forms the outer limiting surface for the roller chain.

2. Apparatus according to claim 1 wherein each unit on said roller chains comprises at least three rollers with links disposed between each end roller and the middle roller and wherein the adjacent rollers in the running direction are of the same length with the two outer rollers on each side supported in a cantilevered fashion with their outer end faces situated in planes forming the outer limiting surfaces.

3. Apparatus according to claim 1 wherein laterally adjacent roller chains directly abut against one another at their end faces.

4. Apparatus according to claim 2 wherein laterally adjacent roller chains directly abut against one another at their end faces.

5. Apparatus according to claim 1 wherein the linking of chains is done in a conventional fashion with each roller pin passing through two links at each linking point, the links being coupled to the adjacent roller units in sequence.

6. Apparatus according to claim 2 wherein the linking of chains is done in a conventional fashion with each roller pin passing through two links at each linking point, the links being coupled to the adjacent roller units in sequence.

7. Apparatus according to claim 1 wherein at each linking point only a single link is present between rollers, linking being done such that first and second units are linked in a plane on one side of a roller, the next subsequent third and fourth units linked in the same plane on the same side of said rollers and the second and third units linked in a plane on the opposite side of said rollers.

8. Apparatus according to claim 2 wherein the outer rollers are substantially shorter in comparison to the inner rollers.

9. Apparatus according to claim 7 wherein the outer rollers are substantially shorter in comparison to the inner rollers.

10. Apparatus according to claim 1 wherein the spacing of the roller axis corresponds approximately to the diameter of the rollers.

* * * * *

UNITED STATES PATENT OFFICE
CERTIFICATE OF CORRECTION

Patent No. 3,993,426　　　　　　　Dated November 23, 1976

Inventor(s) Karl-Heinz Ahrweiler et al.　　　Page 1 of 2

It is certified that error appears in the above-identified patent and that said Letters Patent are hereby corrected as shown below:

Column 2, line 4: delete "when" and insert --with--;

Column 3, line 62: delete "problem" and insert --problems--;

Column 4, line 38: delete "pin" and insert --pins--;

Column 4, line 43: after the word "lying" insert --in--;

Column 5, line 40: delete "alternative" and insert --alternate--;

Column 5, line 59: after the word "three" insert --interior--;

Column 6, line 14: delete "throught" and insert --through--

Column 6, line 16: delete "the" and insert --a--;

Column 6, line 19: after the words "view of" insert --a--;

Column 7, line 36: after the word "flexible" insert --belt--;

Column 7, line 44: delete "platen" and insert --plate--;

Column 7, line 53: delete "the" and insert --an--;

Column 7, line 58: delete "occur" and insert --occurs--;

UNITED STATES PATENT OFFICE
CERTIFICATE OF CORRECTION

Patent No. 3,993,426      Dated November 23, 1976

Inventor(s) Karl-Heinz Ahrweiler et al.    Page 2 of 2

It is certified that error appears in the above-identified patent and that said Letters Patent are hereby corrected as shown below:

Column 8, line 30: delete "chain" and insert --chains--;

Column 8, line 58: delete "face" and insert --faces--;

Column 9, line 16: delete "claims" and insert --chains--.

Signed and Sealed this

Seventh Day of June 1977

[SEAL]

Attest:

RUTH C. MASON
*Attesting Officer*

C. MARSHALL DANN
*Commissioner of Patents and Trademarks*